(12) United States Patent
Wei et al.

(10) Patent No.: US 12,501,358 B2
(45) Date of Patent: Dec. 16, 2025

(54) CONTROL METHOD AND APPARATUS FOR ENERGY CONSERVATION OF BASE STATION, AND COMPUTER-READABLE STORAGE MEDIUM

(71) Applicant: ZTE CORPORATION, Shenzhen (CN)

(72) Inventors: Ping Wei, Shenzhen (CN); Cheng Guo, Shenzhen (CN); Guozheng Wang, Shenzhen (CN); Jiangyun Zhou, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 362 days.

(21) Appl. No.: 18/253,549

(22) PCT Filed: Nov. 11, 2021

(86) PCT No.: PCT/CN2021/130137
§ 371 (c)(1),
(2) Date: May 18, 2023

(87) PCT Pub. No.: WO2022/105671
PCT Pub. Date: May 27, 2022

(65) Prior Publication Data
US 2023/0422166 A1 Dec. 28, 2023

(30) Foreign Application Priority Data
Nov. 20, 2020 (CN) .......................... 202011308662.7

(51) Int. Cl.
*H04W 52/02* (2009.01)

(52) U.S. Cl.
CPC .............................. *H04W 52/0206* (2013.01)

(58) Field of Classification Search
CPC .................................................. H04W 52/0206
See application file for complete search history.

(56) References Cited

U.S. PATENT DOCUMENTS

2017/0272992 A1* 9/2017 Fujishiro .......... H04W 52/0219
2020/0314747 A1 10/2020 Zhou et al.

FOREIGN PATENT DOCUMENTS

| CN | 102143564 A | 8/2011 |
| CN | 103781161 A | 5/2014 |

(Continued)

OTHER PUBLICATIONS

International Searching Authority. International Search Report and Written Opinion for PCT Application No. PCT/CN2021/130137 and English translation, mailed Dec. 29, 2021, pp. 1-10.

(Continued)

*Primary Examiner* — Gbemileke J Onamuti
(74) *Attorney, Agent, or Firm* — Vivacqua Crane, PLLC (57) ABSTRACT

Disclosed are a method and a device for energy saving control of a base station, and a computer-readable storage medium. The method may include: acquiring service data of the base station; triggering an energy-saving mode of the base station corresponding to the service data meeting a trigger condition; calculating a service load of the base station in the energy-saving mode; and controlling, based on a relationship between the calculated service load and a preset slot threshold, a corresponding slot to be off or on.

8 Claims, 5 Drawing Sheets

(56) References Cited

FOREIGN PATENT DOCUMENTS

| | | | | |
|---|---|---|---|---|
| CN | 104812035 | A | 7/2015 | |
| CN | 109257804 | A | 1/2019 | |
| CN | 111615191 | A | 9/2020 | |
| CN | 111885685 | A | 11/2020 | |
| EP | 3379432 | A1 * | 9/2018 | ............. G06Q 10/04 |
| EP | 4398642 | A2 * | 7/2024 | ........... H04L 5/0073 |

OTHER PUBLICATIONS

The State Intellectual Property Office of People's Republic of China. First Office Action for CN Application No. 202011308662.7 and English translation, mailed Sep. 26, 2024, pp. 1-12.
The State Intellectual Property Office of People's Republic of China. First Search Report for CN Application No. 202011308662.7 and English translation, mailed Sep. 19, 2024, pp. 1-5.
European Patent Office. Extended European Search Report for EP Application No. 21893818.1, mailed Apr. 15, 2024, pp. 1-28.

* cited by examiner

CONTROL METHOD AND APPARATUS FOR ENERGY CONSERVATION OF BASE STATION, AND COMPUTER-READABLE STORAGE MEDIUM

CROSS-REFERENCE TO RELATED APPLICATION

This application is a national stage filing under 35 U.S.C. § 371 of international application number PCT/CN2021/130137, filed Nov. 11, 2021, which claims priority to Chinese patent application No. 202011308662.7, filed Nov. 20, 2020. The contents of these applications are incorporated herein by reference in their entirety.

TECHNICAL FIELD

The present disclosure relates to the technical field of communication, and more particularly, to a method and a device for energy saving control of a base station, and a computer-readable storage medium.

BACKGROUND

With the rapid development of 5th Generation Mobile Networks (5G), diversified services and unlimited traffic, people are increasingly inseparable from cell phones and other mobile terminals, and places with a small concentration of people can easily become hot spots. Users of 4G or 5G terminals continue to grow, and communication networks are affected by the growth of terminals, which also makes services highly stressed. The development of new services (such as HD video and mobile games) has led to a dramatic increase in data traffic demand of both terminals and networks. Various demands result in a high-density layout of more base stations, thus causing the following problems such as high energy consumption due to the high-power and high-density layout of 5G base stations, and reduced communication quality caused by inter-cell interference due to the high-density layout of base stations.

SUMMARY

Embodiments of the present disclosure provide a method and a device for energy saving control of a base station, and a computer-readable storage medium, so as to realize energy saving of the base station.

According to an aspect of the embodiments of the present disclosure, a method for energy saving control of a base station is provided. The method may include: acquiring service data of the base station; triggering an energy-saving mode of the base station corresponding to the service data meeting a trigger condition; calculating a service load of the base station in the energy-saving mode; and controlling, based on a relationship between the calculated service load and a preset slot threshold, a corresponding slot to be off or on.

According to another aspect of the embodiments of the present disclosure, a device for energy saving control of a base station is provided. The device may include an acquisition module, configured to acquire service data of the base station; a trigger module, configured to trigger an energy-saving mode of the base station corresponding to the service data meeting a trigger condition; a calculation module, configured to calculate a service load of the base station in the energy-saving mode; and a control module, configured to control, based on a relationship between the calculated service load and a preset slot threshold, a corresponding slot to be off or on.

According to yet another aspect of the embodiments of the present disclosure, provided is a computer-readable storage medium, storing a computer-executable instruction which, when executed by a computer, causes the computer to carry out the method for energy saving control of a base station.

DETAILED DESCRIPTION

In order to make the purposes, technical schemes and advantages of the present disclosure clear, the present disclosure will be further described below in detail in conjunction with the accompanying drawings and embodiments. It should be understood that the embodiments described herein are only used to illustrate the present disclosure, and are not intended to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

Unless otherwise defined, all technical and scientific terms used herein have the same meaning as would normally be understood by those having ordinary skills in the technical field of the present disclosure. The terms used herein are only used to describe the embodiments of the present disclosure, and are not intended to limit the present disclosure.

First, a number of terms used herein are explained as follows.

5G (5th generation mobile networks or 5th generation wireless systems, 5th-Generation, and 5th Generation Mobile Communication Technology): 5G or 5G technology for short. 5G is the latest generation of cellular mobile communication technology and is developed from 4G (LTE-A, WiMax), 3G (UMTS, LTE) and 2G (GSM) systems. 5G is designed to achieve performances such as high data rates, reduced latency, energy savings, lower costs, higher system capacity, and massive device connections.

LTE (Long Term Evolution): the long-term evolution of Universal Mobile Telecommunications System (UMTS) technical standards developed by the 3rd Generation Partnership Project (3GPP) organization.

PCI (Physical-layer Cell Identity): a physical-layer cell ID configured to uniquely identify a cell.

slot: the smallest unit for transmitting circuit switching aggregated information, a time slice in a Time Division Multiplexing (TDM) mode, and a part of the serial self-multiplexing of slot information dedicated to a single channel.

PRB (Physical Resource Block): the resource of 12 consecutive carriers in a frequency domain, and a resource of one slot in a time domain.

Bitmap: bitmap, also known as a dot matrix chart.

NR (New Radio): 5G NR, which supports multiple sub-carrier spacings.

Frame format: the format of different frames according to a protocol.

Broadcast channel: an information channel that transmits information through broadcast.

Currently, the energy consumption of an access network accounts for a vast majority of the energy consumption of the entire communication network. Common energy-saving technologies include: energy-saving technologies for devices, preferably low-power devices, in which a low-power mode of these devices is used reasonably in an idle period to improve the efficiency of power amplifiers and other devices; energy-saving technologies for equipment, in which flexible off-state enabling strategies with different symbols, slots, channels, carrier frequencies, and granularities are provided for different application scenarios based on the tidal effect of service loads of 2/3/4G/WLAN systems in time and space; and energy-saving technologies for networks which allow energy savings through cooperation between WLAN and cellular network based on the characteristics of 2/3/4G/WLAN systems. The energy-saving technologies for networks are mainly used to activate a sleep function of a small base station at low load conditions in a scenario of cell overlapping coverage, so that a low-power mode of the entire base station is enabled to save power.

The schemes provided in the embodiments of the present disclosure relate to a method and a device for energy saving control of a base station, an electronic device and a computer-readable storage medium, which are specifically described by way of the following embodiments. First, the method for energy saving control of a base station in the embodiments of the present disclosure is described.

The method for energy saving control of a base station provided in the embodiments of the present disclosure may be applied to terminals or to servers, and may also be software running in the terminals or servers. In some embodiments, the terminal may be, without limitation, a smart phone, tablet PC, laptop, desktop computer, or smart watch. The server may be configured, without limitation, as an independent physical server, as a server cluster or distributed system composed of a plurality of physical servers, or as a cloud server that provides cloud services, cloud database, cloud computing, cloud functions, cloud storage, network services, cloud communication, middleware services, domain name services, security services, CDN, big data and AI platforms, and other basic cloud computing services. The software may be, without limitation, an application that implement the method for energy saving control of a base station.

Figure 1:
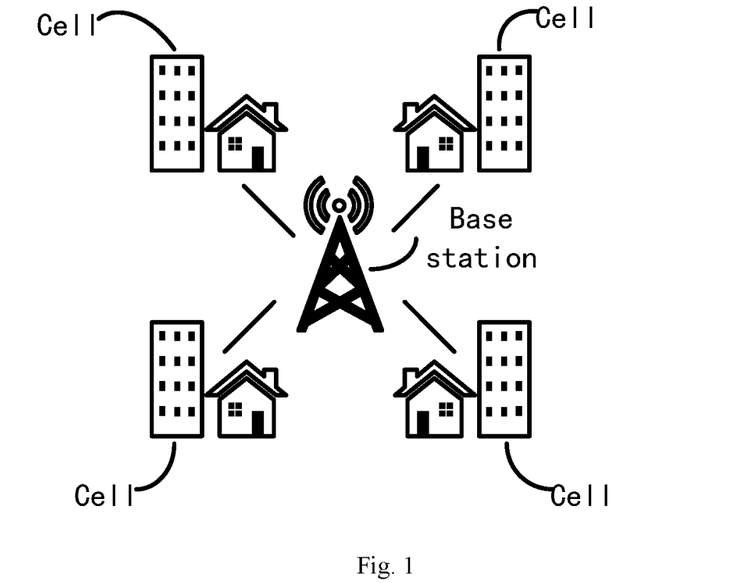
FIG. 1 is a schematic diagram of an application scenario of a method for energy saving control of a base station according to an embodiment of the present disclosure.

FIG. 1 is a schematic diagram of an application scenario according to an embodiment of the present disclosure. The method for energy saving control of a base station in the embodiment of the present disclosure is applied to a network system, where the network system includes: a base station and cells, and network communication can be performed between the base station and the cells. Communication equipment such as computers, TVs and telephones may be installed in the cells.

Figure 2:
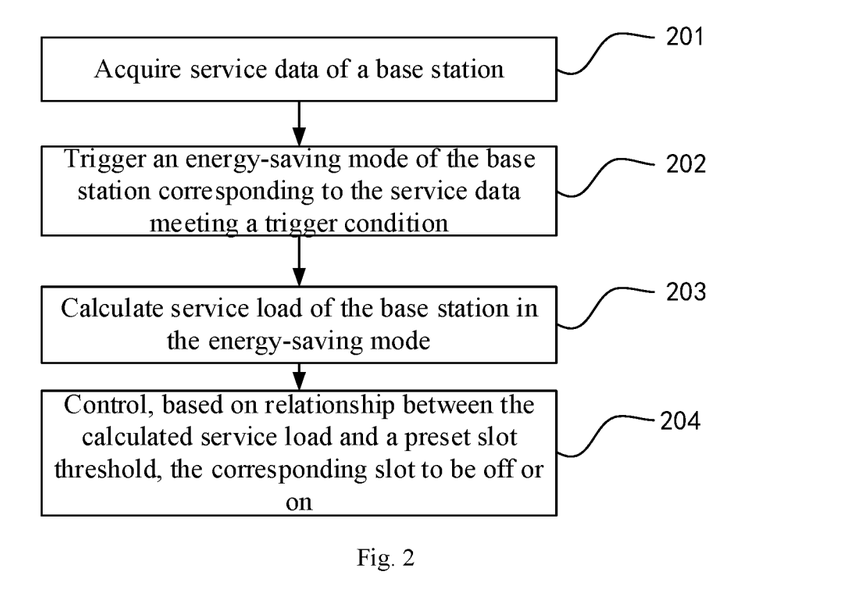
FIG. 2 is a flow chart of a method for energy saving control of a base station according to a first embodiment of the present disclosure.

FIG. 2 is a flow chart of the method for energy saving control of a base station according to the embodiment of the present disclosure. The method in FIG. 2 includes following steps of S201, S202, S203 and S204.

At S201, service data of the base station are acquired.

At S202, an energy-saving mode of the base station corresponding to the service data meeting a trigger condition is triggered.

At S203, a service load of the base station in the energy-saving mode is calculated.

At S204, a corresponding slot is controlled to be off or on based on a relationship between the calculated service load and a preset slot threshold. At S201, the service data may include, without limitation, PRB utilization rate, number of users, priority of current services, and period in which the current services are running. In an embodiment, the service data of the base station include: PRB utilization rate, number of users currently connected to the base station, priority of the current services, and period in which the current services are running.

In S201 of the embodiment of the present disclosure, the obtained trigger condition is used for triggering the energy-saving mode of the base station, and if the base station enters the energy-saving mode, S202 is performed.

In some embodiments, the service data meeting the trigger condition in S202 may include, without limitation, the number of users being less than a user threshold, no preset high-priority services, and the period in which the current services are running being a preset energy-saving period. The energy-saving mode refers to a mode in which part of slots are off while all services are converged in the on-state slots for scheduling based on actual needs.

In practice, the PRB utilization rate refers to a downlink PRB utilization rate. If the downlink PRB utilization rate is less than a slot off threshold, it indicates that the service load is low, so that the base station controls part of the slots to be off and converges all the services in the on-state slots for scheduling, so as to save energy. If the downlink PRB utilization rate is greater than a slot on threshold, it indicates that the service load increases, so that the base station may control the off-state slots to be on and reschedule the slots. The preset high-priority services may be configured based on actual needs, e.g., live streaming and game services are configured as high-priority services, while web browsing and email services are configured as low-priority services. It can be understood that the energy-saving mode may be disabled in response to not meeting one of the following conditions: the number of users is less than the user threshold, the period in which the current services are running is the preset energy-saving period, and there are no preset high-priority services.

In S203 in some embodiments, the service load includes a filter value corresponding to the PRB utilization rate. In an embodiment, the filter value of the PRB utilization rate is the filter value of the downlink PRB utilization rate. In actual scheduling, since the service data may vary greatly in different periods, in order to prevent inaccurate statistics of the PRB utilization rates due to great variations, the PRB utilization rates in several previous periods are weighted as the PRB utilization rate in the current period when making statistics on the PRB utilization rate in the current period.

Figure 3:
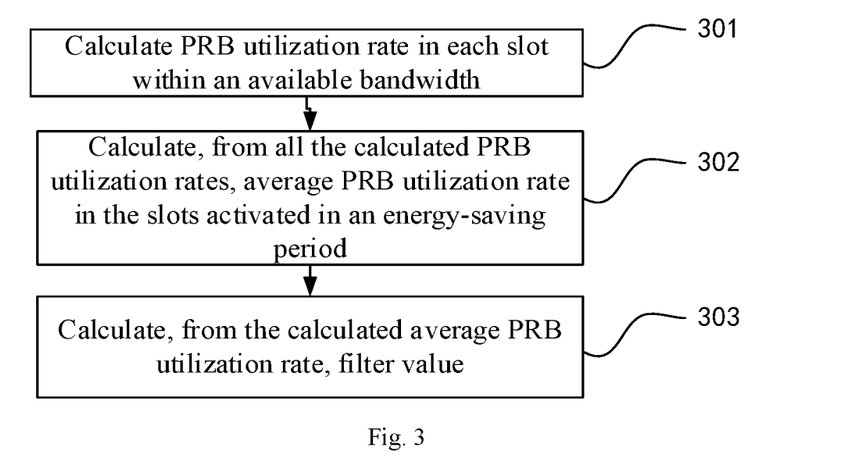
FIG. 3 is a flow chart of S203 in FIG. 2.

FIG. 3 is a flow chart of S203 according to the embodiment of the present disclosure, including following steps of S301, S302 and S303.

At S301, the PRB utilization rate in each slot within an available bandwidth is calculated.

At S302, an average PRB utilization rate in the slots activated in an energy-saving period is calculated from all the calculated PRB utilization rates.

At S303, the filter value is calculated from the calculated average PRB utilization rate.

In some embodiments, the PRB utilization rate is the downlink PRB utilization rate and also the current downlink PRB utilization. In S301, after the energy-saving mode of the base station is enabled, the PRB utilization rate in each slot within the available bandwidth is calculated, where the current PRB utilization rate is equal to a value obtained by dividing the number of PRBs scheduled in a previous slot by the number of PRBs available in a current slot. In an embodiment, the PRB utilization rate in 301 is calculated as shown in Equation (1):

$$P_{p\_n} = \frac{Ps}{Pa}, \qquad \text{Equation (1)}$$

where $P_{p\_n}$ is the PRB utilization rate in the current slot, namely the PRB utilization rate of an $n^{th}$ downlink slot currently activated, Ps is the number of PRBs scheduled in the current slot, and Pa is the number of PRBs available in the current slot.

In S302, an average PRB utilization rate in the slots activated in the energy-saving period is calculated from all the calculated PRB utilization rates, as shown in Equation (2):

$$P_{avg} = \frac{1}{N}\sum_{n=1}^{N} Pp\_n, \qquad \text{Equation (2)}$$

where $P_{avg}$ is the average PRB utilization rate in the slots activated in the energy-saving period, N is a total number of slots activated in the energy-saving period, and $P_{p\_n}$ is the PRB utilization rate in the $n^{th}$ slot activated.

In S303, the filter value is calculated from the calculated average PRB utilization rate, as shown in Equation (3):

$$P_f = \alpha * P_{p\_n} + (1-\alpha) * P_{p\_n-1} \qquad \text{Equation (3),}$$

where $P_f$ is the filter value, and a is a filter coefficient, which may be configured as required and is a decimal between 0 and 1, $P_{p\_n}$ is the PRB utilization rate in the $n^{th}$ slot activated, and $P_{p\_n-1}$ is the PRB utilization rate of an $n-1^{th}$ slot activated.

In S204 in some embodiments, the slot threshold includes a slot off threshold and a slot on threshold, and the relationship between the filter value and the preset slot threshold is as follows:
the filter value is less than the preset slot off threshold; or
the filter value is greater the preset slot on threshold; or
the filter value is between the slot off threshold and the slot on threshold, where the slot off threshold is less than the slot on threshold.

In some embodiments, S204 includes:
controlling M slot(s) to be off if the filter value is less than the preset slot off threshold, where M is an integer from 1 to 99. The value of M denotes the granularity of off-state slots and depends on the energy-saving period. A too large value of M will result in convergence failure of the system, while a too small value will result in slow response of the system.

In an embodiment, if the filter value is less than the preset slot off threshold, a slot off-state enabling strategy will be initiated, i.e., periodic statistics and calculation will be made on the PRB utilization rates, where the duration of the period may be configured, without limitation, as an integer multiple of an NR radio frame. For example, if the period of the NR radio frame lasts 10 ms, the duration may be configured as: 20 ms, 30 ms, 40 ms, etc.

In practice, if the filter value is less than the preset slot off threshold, i.e., at low service load, the base station controls part of the downlink slots (such as M slot(s)) to be off and converges all the current services in the on-state slots for scheduling, so as to save energy.

It can be understood that the slot off-state enabling strategy further includes:
calculating a PRB utilization rate $P_{next1}$ after continuously controlling M slot(s) to be off in a next energy-saving period; and
controlling the M slot(s) to be off in the next energy-saving period if the PRB utilization rate $P_{next1}$ is less than the slot off threshold.

The PRB utilization rate P1 after continuously controlling M slot(s) to be off in the next energy-saving period is calculated as shown in Equation (4):

$$P_{next1} = P_f \times \frac{N}{N-M}, \qquad \text{Equation (4)}$$

where $P_{next1}$ is the PRB utilization rate after continuously controlling M slot(s) to be off in the next energy-saving period, $P_f$ is the filter value, N is the total number of the downlink slots activated in the energy-saving period, and M is the number of the slots continuously controlled to be off in the next energy-saving period.

In an embodiment, taking an energy-saving period of 20 ms as an example, if the energy-saving period is 20 ms and there are 32 downlink slots in the current period (i.e., N=32), two slots are controlled to be off (i.e., M=2).

Further, the number of the slots controlled to be off in the next energy-saving period is equal to the sum of the number of the off-state slots in the current energy-saving period and the M slot(s), i.e., the number of the slots controlled to be off in the next energy-saving period=the number of the off-state slots in the current energy-saving period+M. Taking the above embodiment as an example, if M slot(s) are controlled to be off in the current energy-saving period, there are M+M slot(s) controlled to be off in the next energy-saving period and M+M+M off-state slots in a period after the next energy-saving period, and so on, and the calculation equation is shown in Equation (5):

$$\text{OffNUM}_{n+1} = \text{OffNUM}_n + M \qquad \text{Equation (5),}$$

where $\text{OffNUM}_{n+1}$ is the number of the downlink slots controlled to be off in the next energy-saving period, an initial value of $\text{OffNUM}_{n+1}$ is set to 0, and $\text{NUM}_n$ is the number of the downlink off-state slots in the current energy-saving period.

The S204 further includes:
controlling L slot(s) to be on if the filter value is greater than the preset slot on threshold, where L is an integer from 1 to 99.

In an embodiment, if the filter value is greater the preset slot on threshold, a slot on-state enabling strategy will be initiated, i.e., periodic statistics and calculation will be made on the PRB utilization rates, where the duration of the period may be configured, without limitation, as an integer multiple of the NR radio frame.

In practice, if the filter value is greater than the preset slot on threshold, i.e., an increase in the service load is detected, the base station controls the off-state slots (such as L slot(s)) to be on again for rescheduling.

It can be understood that the slot on-state enabling strategy further includes:

calculating a PRB utilization rate $P_{next2}$ after the L slot(s) are continuously controlled to be on in the next energy-saving period; and controlling the L slot(s) to be on in the next energy-saving period if the PRB utilization rate $P_{next2}$ is greater the slot on threshold.

The PRB utilization rate $PP_{next2}$ after the L slot(s) are controlled to be on in the next energy-saving period is as shown in Equation (6):

$$P_{next2} = P_f \times \frac{N}{N+L}, \quad \text{Equation (6)}$$

where $P_{next2}$ is the PRB utilization rate after controlling the L slot(s) to be on in the next energy-saving period, $P_f$ is the filter value, N is the total number of the downlink slots activated in the energy-saving period, and L is the number of the downlink slots controlled to be on in the next energy-saving period. The value of L denotes the granularity of on-state slots and depends on the energy-saving period. A too large value of L will result in convergence failure of the system, while a too small value will result in slow response of the system. In an embodiment, taking an energy-saving period of 20 ms as an example, if the energy-saving period is 20 ms and there are 32 downlink slots in the current period (i.e., N=32), three slots are controlled to be on (i.e., L=3).

Further, the number of the slots controlled to be off in the next energy-saving period is equal to the sum of the number of the off-state slots in the current energy-saving period minus the L slot(s), i.e., the number of the slots controlled to be off in the next energy-saving period=the number of the off-state slots in the current energy-saving period—L. Taking the above embodiment as an example, if M slot(s) are controlled to be off and L slot(s) are controlled to be on in the current energy-saving period, there are M-L slot(s) controlled to be off in the next energy-saving period and M-L-L off-state slots in the period after the next energy-saving period, and so on, and the calculation equation is shown in Equation (7):

$$\text{OffNUM}_{n+1} = \text{OffNUM}_n - L \quad \text{Equation (7),}$$

where $\text{OffNUM}_{n+1}$ is the number of the downlink slots controlled to be off in the next energy-saving period, an initial value of $\text{OffNUM}_{n+1}$ is set to 0, and $\text{NUM}_n$ is the number of the downlink off-state slots in the current energy-saving period.

The S204 further includes:

controlling the number of the on-state slots in the current period to be unchanged if the filter value is between the slot off threshold and the slot on threshold.

In an embodiment, the filter value being between the slot off threshold and the slot on threshold includes:

the filter value being greater than or equal to the slot off threshold; or the filter value being less than or equal to the slot on threshold.

It can be understood that, if the filter value is between the slot off threshold and the slot on threshold, the number of the on-state slots in the current period remains unchanged, with no slots being controlled to be off or on again.

According to the method for energy saving control of a base station in the embodiment of the present disclosure, the service data of the base station are acquired, the energy-saving mode of the base station corresponding to the service data meeting the trigger condition is triggered, and the filter value of the base station in the energy-saving mode is calculated, so that the corresponding slots are controlled to be off or on based on the relationship between the calculated filter value and the preset slot threshold. For example, when the filter value is less than the preset slot off threshold, i.e., at low service load, the base station controls part of the downlink slots (such as M slot(s)) to be off and converges all the current services in the on-state slots for scheduling, so as to save energy.

The method for energy saving control of a base station in the embodiment of the present disclosure further includes: maintaining the bitmap of the corresponding slot.

In an embodiment, based on different radio frame formats, the bitmaps of a group of slots are maintained in a cell, and a period duration of the bitmaps is configured based on actual needs, which may be configured, without limitation, as an integer multiple of the NR radio frame. For example, if the period of the NR radio frame lasts 10 ms, the period duration may be configured as: 20 ms, 30 ms, 40 ms, etc.

Figure 4:
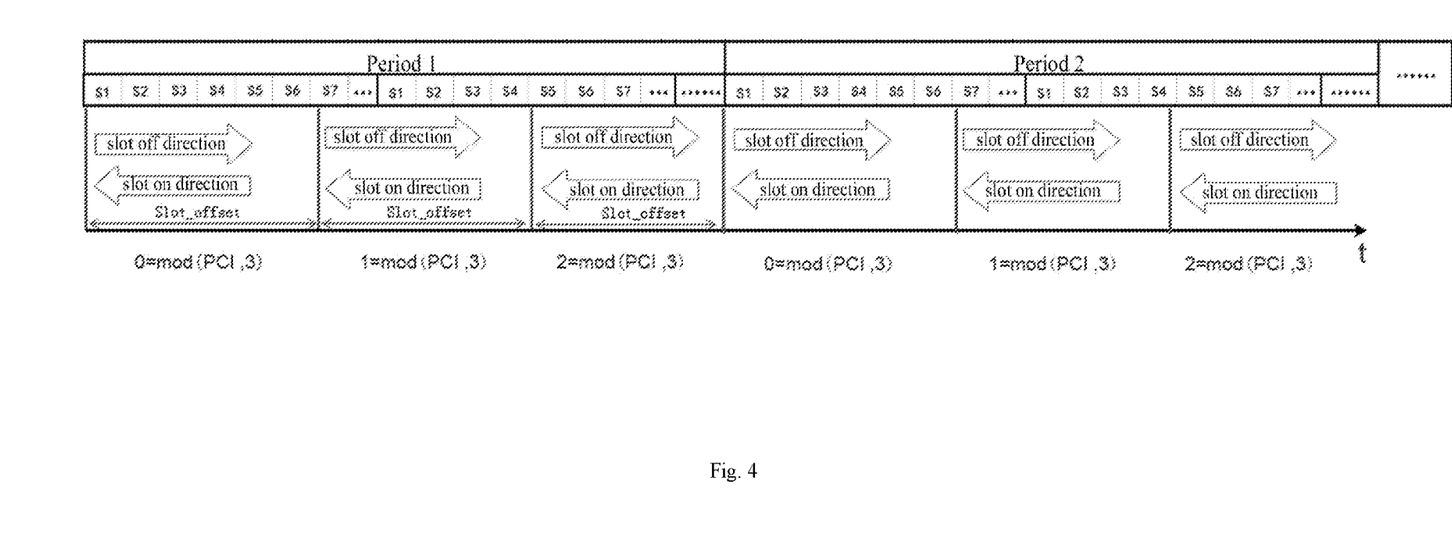
FIG. 4 is a schematic diagram of bitmaps obtained in a method for energy saving control of a base station according to a second embodiment of the present disclosure.

FIG. 4 is a schematic diagram of the bitmaps. A detail description will be made with reference to FIGS. 5 and 6.

In practice, different frame formats refer to the bitmaps of slots with different structures, and the slots are controlled to be off and then on from left to right. The bitmap is numbered, a common channel configuration of the cell is identified, and the slot with the corresponding number being the common channel configuration of the cell is controlled to be on, so that other services can also be scheduled normally in the on-state slot.

Figure 5:
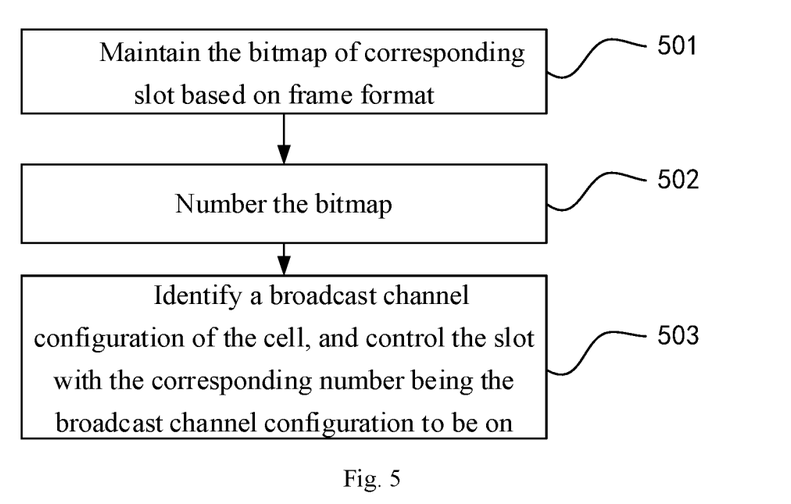
FIG. 5 is a flow chart of obtaining the bitmaps in the method for energy saving control of a base station according to the second embodiment of the present disclosure.

In an embodiment, as shown in FIG. 5, maintaining bitmap of corresponding slot includes the following steps of S501, S502 and S503.

At S501, the bitmap of corresponding slot is maintained based on the frame format.

At S502, the bitmap is numbered.

At S503, a broadcast channel configuration of the cell is identified, and slot with the corresponding number being the broadcast channel configuration is controlled to be on.

In S501, since different frame formats may need to refer to the bitmaps of slots with different structures, the bitmaps of different slots corresponding to the different frame formats may need to be maintained.

In S502, the bitmaps are numbered on the principle of controlling the slots to be off or on randomly, such that the scheduling latency can be prevented from being affected due to the fact the slots are controlled to be off in a centralized manner.

In S503, a broadcast channel configuration of the cell is identified, and slot with the corresponding number being the broadcast channel configuration is controlled to be on, so that other services can also be scheduled normally in the on-state slot.

Further, in a hybrid mode (i.e., 4G LET and 5G NR share a base station), maintaining slot offsets of corresponding slots to obtain the bitmaps of each cell further including: in the hybrid mode where 4G LET and 5G NR share a base station, controlling the slots corresponding to the LTE broadcast channel configuration to be on, such that other services can also be scheduled normally in the on-state slots.

Figure 6:
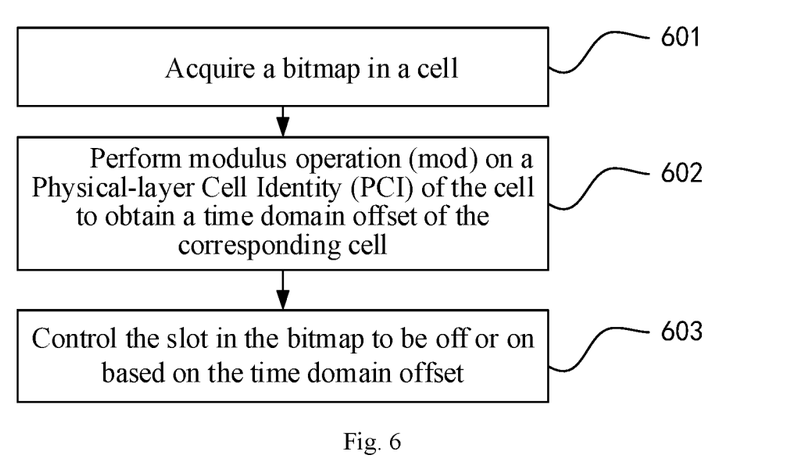
FIG. 6 is a flow chart of obtaining bitmaps in a method for energy saving control of a base station according to a third embodiment of the present disclosure.

In another embodiment, as shown in FIG. 6, maintaining bitmaps of corresponding slots includes the following steps of S601, S602 and S603.

At S601, the bitmap of a cell is acquired.

At S602, a modulus operation (mod) is performed on the PCI of the cell to obtain a time domain offset in the bitmaps of the corresponding cell. A modulus operation (mod) is performed on the PCI of the cell to obtain a time domain offset in the bitmaps of the corresponding cell.

At S603, the slot in the bitmap is controlled to be off or on based on the time domain offset.

In S601, in a single mode (a 5G NR base station) with multiple carriers, acquiring the bitmaps of slots in a cell includes:

assigning a bitmap to each carrier;
acquiring configuration parameters of other carriers; and
acquiring the bitmap of the slot in the cell based on an intersection of common channels.

In an embodiment, in S602, cyclic shifting is performed based on the time domain offsets in the bitmaps acquired in S601 to obtain three new bitmaps. An interval between starting points of two new adjacent bitmaps is marked as Slot_offset, the cyclic shifts of the bitmaps are of the same length, where the equation for the interval Slot_offset between the starting points of the two new adjacent bitmaps is shown in Equation (8):

$$\text{Slot\_offset} = \text{Round}\left(\frac{\text{length (bitmap)}}{3}\right), \quad \text{Equation (8)}$$

where length(bitmap) denotes the length of the bitmap.

In an application scenario, there are 40 slots in two radio frames, namely slots S0, S1, S2, S3, S4, S5, . . . , S22, S23, 24, S5, S25, S26, . . . , S37, S38, and S39. Cyclic shifting, from the slot S0 to the slot S13, from the slot S13 to the slot S26, and from the slot S26 to the slot S39, is performed based on the time domain offset to obtain three new bitmaps, so as to obtain a first new bitmap of the slots from S0 to S39, a second new bitmap of the slots from S13 to S39 and the slots form S0 to S12, and a third new bitmap of the slots from S26 to S39 and the slots from S0 to S25.

In an embodiment, in S602, a mod 3 is performed on the PCI of the cell to obtain a time domain offset Slot_offset*mod (PCI,3) in the bitmaps of the corresponding cell, to obtain the bitmaps used in each PCI cell.

If the mod (PCI,3) is 0, a start offset of the bitmap of the slots is 0*Slot_offset.

If the mod (PCI,3) is 1, the start offset of the bitmap of the slots is 1*Slot_offset.

If the mod (PCI,3) is 2, the start offset of the bitmap of the slots is 2*Slot_offset.

In S603, when being controlled to be off or on based on the time domain offset, the bitmaps are controlled to be off and then on from left to right based on an off-state enabling principle. A further description is made with reference to FIG. 4.

As shown in FIG. 4, for example, in a period 1, there are two radio frames containing a total of 40 slots, namely slots S0, S1, S2, S3, S4, S5, . . . , S22, S23, 24, S5, S25, S26, . . . , S37, S38, and S39 (not shown). If the mod (PCI,3) is 2, the start offset of the bitmap of the slots is 2*Slot_offset.

The off-state enabling principle is to control the slots to be off and then on from left to right. For example, the slots S26, S27, S28, . . . , S38, S39, S0, S1, . . . , S24 and S25 are controlled to be off in sequence from left to right, and the slots S25, S24, . . . , S26 are controlled to be on in sequence from right to left if needed.

In the embodiment of the present disclosure, the mod operation is performed on the PCI of each cell; the slot offsets are different based on different calculation results and different number of carriers; different results correspond to different slot offset based on different PCIs of the cells; and a start slot in scheduling slots is different for different cells. Therefore, each cell may only maintain its own bitmaps, all cells are independent of each other, and time domains are staggered and scheduled in a time-sharing manner, which can effectively suppress inter-cell signal interference.

According to the method for energy saving control of a base station in the embodiment of the present disclosure, the service data of the base station are acquired, the energy-saving mode of the base station corresponding to the service data meeting the trigger condition is triggered, and the service load of the base station in the energy-saving mode is calculated, so that the corresponding slots are controlled to be off or on based on the relationship between the calculated service load and the preset slot threshold. For example, if the service load is less than the preset slot off threshold, i.e., at low service load, the base station controls part of the downlink slots (such as M slot(s)) to be off and converges all the current services in the on-state slots for scheduling, so as to save energy. That is, the number of the on-state slots in the energy-saving period is determined through the statistics of service load, such that the services are converged in the time domain, and resources in the frequency domain are expanded for scheduling. Power amplifiers and other energy consumption devices of the base station can be turned off in an idle period of the time domain, to save energy and reduce consumption. In the embodiments of the present disclosure, the mod operation is further performed on the PCI of each cell, the slot offsets are different based on different calculation results and different number of carriers, different results correspond to different slot offset based on different PCIs of the cells, and a start slot in scheduling slots is different for different cells. Therefore, each cell may only maintain its own bitmaps, and all cells are independent of each other for scheduling in a time-sharing manner, which can effectively suppress inter-cell signal interference.

In addition, by maintaining the bitmaps of the slots, different cells of the same base station can be scheduled in staggered time domains, which can effectively avoid cell signal interference. More specifically, at low service load, the base station controls part of the downlink slots to be off, and converges all the services in the on-state slots for scheduling, so as to save energy. After an increase in the service load is detected, the off-state slots are controlled to be on for rescheduling. At the same time, at low service load in different cells, different slots are controlled to be on for scheduling based on the principle of staggered time domains, thus suppressing inter-cell signal interference in the time domains.

Common energy-saving methods include: carrier turn-off, antenna channel turn-off, intelligent turn-off, etc., and have the following shortcomings. The turn-off or/and turn-on operation is slow, the response is not timely enough, the turn-off and turn-on operations are usually timed, and no real-time turn-on operation is allowed. The turn-off operation is realized roughly, affecting the coverage of services. The energy-saving mode of the base station in a "hot spot"

area (the area where network communication is intensively available for a plurality of communication devices) may never be triggered. Due to limitations, these methods have limited suppression effects and thus cannot be adapted to all types of base stations. Compared with the common energy-saving methods, the energy-saving method proposed in the embodiments of the present disclosure can respond fast and dynamically in real time around the clock, adjust the mode of the base station based on the current services of the base station without affecting the coverage of services, is adapted to all types of base stations and can effectively suppress inter-cell interference.

In the embodiment of the present disclosure, the method is applied in 5G. In practice, different frame formats refer to the bitmaps of slots with different structures, and the slots are controlled to be off and then on from left to right. The common channel configuration of the cell is identified, and the slots where the corresponding common channel is located in the bitmaps of slots are controlled to be on, so that other services can also be scheduled normally in the on-state slots. In the hybrid mode, the slots where the LTE broadcast channel is located are controlled to be on, so that other services can also be scheduled normally in the on-state slots. Based on different cell attributes (PCIs of the cells), different PCIs and different number of carriers, the slot offsets are different in the cells. Therefore, each cell may only maintain its own bitmaps, and all cells are independent of each other for scheduling in a time-sharing manner, which can effectively suppress inter-cell signal interference at low service load.

Figure 7:
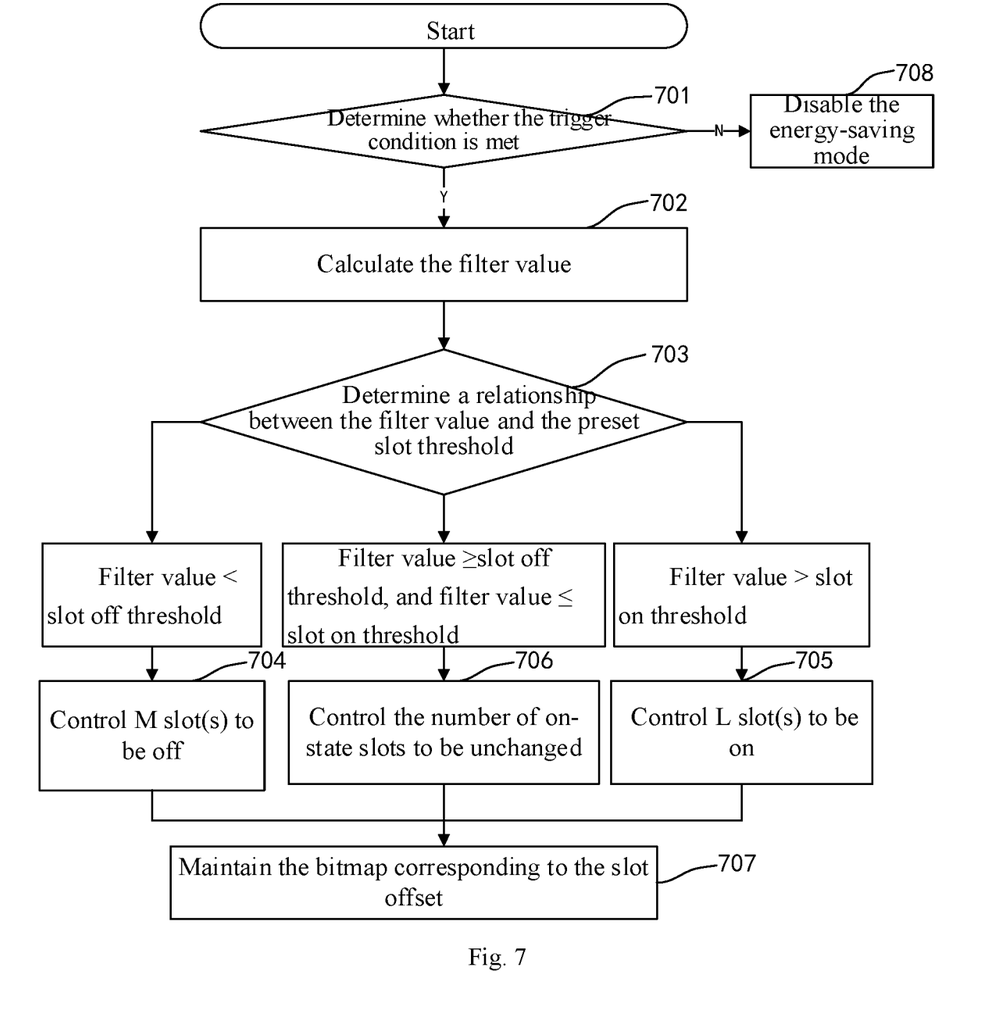
FIG. 7 is a flow chart of an application scenario of the method for energy saving control of a base station according to an embodiment of the present disclosure.

FIG. 7 is a flow chart of an application scenario of the method for energy saving control of a base station according to the embodiment of the present disclosure. The method in FIG. 7 includes the following steps of S701, S702, S703, S704, S705, S706 and S708.

At 701, whether a trigger condition is met is determined; a energy-saving mode is triggered if the trigger condition is met, and S702 is performed; otherwise, S708 is performed.

At S702, a filter value is calculated.

At S703, a relationship between the filter value and a preset slot threshold is determined; if the filter value is less than the preset slot off threshold, S704 is performed; and if the filter value of a PRB utilization rate is greater the preset slot on threshold, S705 is performed; otherwise, S706 is performed.

At S704, M slot(s) are controlled to be off, and S707 is performed.

At S705, L slot(s) are controlled to be on, and S707 is performed.

At S706, the number of the slots controlled to be on remains unchanged, and S707 is performed.

At S707, slot offsets are maintained to obtain the bitmaps of each cell.

At S708, the energy-saving mode is disabled.

In the embodiment of the present disclosure, the method is applied in 5G. In practice, different frame formats refer to the bitmaps of slots with different structures, and the slots are controlled to be off and then on from left to right. The common channel configuration of the cell is identified, and the slots where the corresponding common channel is located in the bitmaps of slots are controlled to be on, so that other services can also be scheduled normally in the on-state slots. In the hybrid mode, the slots where the LTE broadcast channel is located are controlled to be on, so that other services can also be scheduled normally in the on-state slots. Based on different cell attributes (PCIs) and different number of carriers, the slot offsets are different, so each cell may only maintain its own bitmaps, and all cells are independent of each other for scheduling in a time-sharing manner, which can effectively suppress inter-cell signal interference at low service load.

According to an embodiment of the present disclosure, a device for energy saving control of a base station is further provided, which can implement the above method for energy saving control of a base station. The device includes: an acquisition module, a trigger module, a calculation module, and a control module.

The acquisition module is configured to acquire service data of the base station.

The trigger module is configured to trigger an energy-saving mode of the base station corresponding to the service data meeting a trigger condition.

The calculation module is configured to calculate a service load of the base station in the energy-saving mode.

The control module is configured to control, based on a relationship between the calculated service load and a preset slot threshold, corresponding slots to be off or on.

In another embodiment of the present disclosure, a device for energy saving control of a base station is further provided, including: at least one memory, at least one processor, and at least one program stored in the at least one memory which, when executed by the at least one processor, causes the at least one processor to carry out the method for energy saving control of a base station in the embodiments. The device for energy saving control of a base station may be any smart terminal such as cell phone, tablet PC, Personal Digital Assistant (PDA), Point of Sales (POS), and car PC.

According to an embodiment of the present disclosure, provided is a computer-readable storage medium, storing a computer-executable instruction which, when executed by a processor, causes the processor to implement the above method for energy saving control of a base station.

According to the method and the device for energy saving control of a base station, the electronic device and the computer-readable storage medium in the embodiments of the present disclosure, the service data of the base station are acquired, the energy-saving mode of the base station corresponding to the service data meeting the trigger condition is triggered, and the service load of the base station in the energy-saving mode is calculated, so that the corresponding slots are controlled to be off or on based on the relationship between the calculated service load and the preset slot threshold. For example, when the service load is less than the preset slot off threshold, i.e., at low service load, the base station controls part of the downlink slots (such as M slot(s)) to be off and converges all the current services in the on-state slots for scheduling, so as to save energy.

In addition, in the embodiment of the present disclosure, the mod operation is further performed on the PCI of each cell, different results correspond to the different slot offset based on different PCIs of the cells, and the start slot in the scheduling slots is different for different cells. Therefore, each cell may only maintain its own bitmaps, and all cells are independent of each other for scheduling in a time-sharing manner, which can effectively suppress inter-cell signal interference.

As a non-transitory computer-readable storage medium, the memory may be configured to store non-transitory software programs and non-transitory computer-executable programs. In addition, the memory may include high-speed RAM and non-transitory memory, such as at least one disk memory, flash memory, or other non-transitory solid-state memories. In some embodiments, the memory may include memories remotely located with respect to the processor, and these remote memories may be connected to the processor through a network. The above network, for example, includes the Internet, an intranet, an LAN, a mobile communications network, and combinations thereof.

The embodiments described in the embodiments of the present disclosure are only used to clearly describe and are not intended to limit the technical schemes provided in the embodiments of the present application. It is known to those having ordinary skills in the art that the technical schemes provided in the embodiments of the present disclosure are also applicable to similar technical problems as technology evolves and new application scenarios emerge.

It can be understood by those having ordinary skills in the art that the steps shown in FIGS. 2-3 and 5-7 are not intended to limit the embodiments of the present disclosure, and there may be more or fewer steps than or different steps from those shown, or some steps may be combined.

The above embodiments of the device are merely exemplary embodiments, in which the units described as separate components may or may not be physically separated, i.e., these units may be located in one place, and may also be distributed over a plurality of network units. Part or all of the modules can be selected based on actual needs to achieve the purpose of the schemes in the embodiments.

Those having ordinary skills in the art can understand that all or part of the steps, and functional modules/units in the system and device disclosed above may be implemented as software, firmware, hardware, and appropriate combinations thereof.

It should be noted that the terms "first", "second", "third", "fourth" and the like (if any) in the description and the above accompanying drawings of the present disclosure are used to distinguish similar objects, and are not necessarily used to describe a specific sequence or a precedence order. It should be understood that the terms so used are interchangeable under appropriate circumstances such that the embodiments of the present disclosure described herein can be implemented in a different order from those illustrated or described herein. Furthermore, the terms "include", "have", and any variations thereof are intended to cover non-exclusive inclusion, e.g., a process, method, system, product or equipment including a series of steps or units is not necessarily limited to those explicitly listed, but may include other steps or units not explicitly listed or inherent to the process, method, product or equipment.

It should be understood that, in the present disclosure, "at least one of" means one or more, and "a plurality of" means two or more. The term "and/or" is used for describing an association relationship of associated objects, indicating that there may be three kinds of relations. "For example, "A and/or B" may mean A only, B only, and both A and B, where A and B may be singular or plural. The character "/" generally indicates an "Or" relationship between the associated objects. "At least one of the following items" or similar expressions means any combination of these items, including any combination of singular or plural items. For example, at least one of a, b or c may mean "a and b", "a and c", "b and c", or "a, b and c", where a, b and c may be singular or plural, respectively.

It should be understood that the device and the method disclosed in several embodiments of the present disclosure may also be implemented in other ways. For example, the embodiments of the device described above are merely exemplary embodiments. For example, the division of the units, which is only the division of logical functions, may be implemented in other ways in practice, e.g., a plurality of units or components may be combined or integrated in another system, or certain features may be omitted or not implemented. In addition, the mutual or direct coupling or communication connections shown or discussed herein may be indirect coupling or communication connections between the devices or units through some interfaces, and may also be electrical connection, mechanical connection, or connections in other forms.

The units described as separate components may or may not be physically separated, and the components described as units may or may not be physical units, i.e., these units may be located in one place, and may also be distributed over a plurality of network units. Part or all of the units can be selected based on actual needs to achieve the purpose of the schemes in the embodiments.

In addition, all functional units in the embodiments of the present disclosure may be integrated into one processing unit and may also exist separately, or two or more units may be integrated into one unit. The above units may be integrated by hardware or software functional units.

The integrated unit, if implemented in the form of a software functional unit and sold or used as a stand-alone product, may be stored in a computer-readable storage medium. Based on this understanding, the technical schemes of the present disclosure, or the part of the technical schemes that essentially contributes to the prior art, or all or part of the technical schemes, may be embodied in the form of a software product. The computer software product is stored in a storage medium, storing a plurality of instructions configured to enable computer equipment (which may be a PC, a server, or a network device) to perform all or part of the steps of the method described in the embodiments of the present disclosure. The above storage medium includes: a USB disk, a mobile hard disk, a Read-Only Memory (ROM), a Random Access Memory (RAM), a magnetic disk or optical disks, and other media that can store programs.

Some of the embodiments of the present disclosure are described above with reference to the accompanying drawings, and are not intended to limit the scope of protection of the embodiments of the present disclosure. All modifications, equivalent substitutions and improvements made by those having ordinary skills in the art without departing from the protection scope of the embodiments of the present disclosure shall fall into in the protection scope of the embodiments of the present disclosure.

The invention claimed is:

1. A method for energy saving control of a base station, comprising:
   acquiring service data of the base station;
   triggering an energy-saving mode of the base station corresponding to the service data meeting a trigger condition;
   calculating a service load of the base station in the energy-saving mode;
   controlling, based on a relationship between the calculated service load and a preset slot threshold, a corresponding slot to be off or on; and
   maintaining a bitmap corresponding to the slot, comprising:
      acquiring a bitmap of a cell;
      performing a modulus operation (mod) on a Physical-layer Cell Identity (PCI) of the cell to obtain a time domain offset of the corresponding cell; and
      controlling the slot in the bitmap to be off or on based on the time domain offset.

2. The method of claim 1, wherein the service load comprises a filter value, and calculating a service load of the base station in the energy-saving mode comprises:

calculating a Physical Resource Block (PRB) utilization rate in each slot within an available bandwidth;

calculating, from all the calculated PRB utilization rates, an average PRB utilization rate in the slots activated in an energy-saving period; and calculating, from the calculated average PRB utilization rate, the filter value.

3. The method of claim 2, wherein the slot threshold comprises a slot off threshold, and a relationship between the filter value and the preset slot threshold comprises the filter value being less than the slot off threshold; and controlling, based on a relationship between the calculated filter value and the preset slot threshold, the corresponding slot to be off or on comprises:

controlling M slot(s) to be off in response to the filter value being less than the slot off threshold, wherein M is an integer from 1 to 99.

4. The method of claim 3, wherein controlling, based on a relationship between the calculated filter value and the preset slot threshold, the corresponding slot to be off or on comprises:

calculating a PRB utilization rate $P_{next1}$ after continuously controlling M slot(s) to be off in a next energy-saving period; and controlling M slot(s) to be off in the next energy-saving period in response to the calculated PRB utilization rate $P_{next1}$ being less than the slot off threshold, wherein M is an integer from 1 to 99.

5. The method of claim 3, wherein the slot threshold further comprises a slot on threshold, and the relationship between the filter value and the preset slot threshold comprises the filter value being greater than the slot on threshold; and controlling, based on a relationship between the calculated filter value and the preset slot threshold, the corresponding slot to be off or on further comprises:

controlling L slot(s) to be on in response to the calculated filter value being greater than the slot on threshold, wherein L is an integer from 1 to 99.

6. The method of claim 1, further comprising:

maintaining a slot offset corresponding to the slot to obtain the bitmap of each cell comprising:

maintaining the bitmap of the corresponding slot based on a frame format;

numbering the bitmap; and identifying a broadcast channel configuration of the cell, and controlling the slot with the corresponding number being the broadcast channel configuration to be on.

7. A base station, comprising:

a memory configured to store a computer program; and a processor, configured to execute the computer program, and to implement a method for energy saving control, which comprising:

acquiring service data of the base station;

triggering an energy-saving mode of the base station corresponding to the service data meeting a trigger condition;

calculating a service load of the base station in the energy-saving mode;

controlling, based on a relationship between the calculated service load and a preset slot threshold, a corresponding slot to be off or on; and maintaining a bitmap corresponding to the slot, comprising:

acquiring a bitmap of a cell;

performing a modulus operation (mod) on a Physical-layer Cell Identity (PCI) of the cell to obtain a time domain offset of the corresponding cell; and controlling the slot in the bitmap to be off or on based on the time domain offset.

8. A non-transitory computer-readable storage medium, storing a computer-executable instruction which, when executed by a computer, causes the computer to carry out the method of claim 1.

* * * * *